(12) United States Patent
Seehafer et al.

(10) Patent No.: US 7,122,503 B2
(45) Date of Patent: Oct. 17, 2006

(54) UNIFORM MICROCAPSULES

(75) Inventors: Troy Ronald Seehafer, Appleton, WI (US); George Arthur Stahler, Wisconsin Dells, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 11/051,744

(22) Filed: Mar. 28, 2005

(65) Prior Publication Data

US 2005/0158547 A1    Jul. 21, 2005

Related U.S. Application Data

(62) Division of application No. 10/099,757, filed on Mar. 13, 2002, now Pat. No. 6,890,592.

(51) Int. Cl.
  *B41M 5/20*    (2006.01)
  *B41M 5/30*    (2006.01)
  *B05D 7/00*    (2006.01)
  *B01J 13/02*   (2006.01)
  *C08K 9/10*    (2006.01)

(52) U.S. Cl. .................. 503/214; 503/215; 428/402.2; 428/402.21; 428/402.22; 424/490; 424/491; 430/138

(58) Field of Classification Search .............. 503/214, 503/215; 424/490, 491, 497; 427/213.24, 427/213.32, 213.35; 430/138; 428/402.21, 428/402.2, 402.22
See application file for complete search history.

(56) References Cited

U.S. PATENT DOCUMENTS

| | | | |
|---|---|---|---|
| 4,789,550 A * | 12/1988 | Hommel et al. ............ 424/493 |
| 4,920,027 A * | 4/1990  | Kakimi ...................... 430/138 |
| 5,278,106 A   | 1/1994  | Nakashima et al. .......... 501/12 |
| 5,376,347 A   | 12/1994 | Ipponmatsu et al. ........ 423/338 |
| 5,643,506 A   | 7/1997  | Rourke ....................... 264/4.1 |
| 5,756,632 A   | 5/1998  | Ward et al. .................... 528/28 |
| 5,766,317 A   | 6/1998  | Cable et al. .................... 96/10 |
| 5,804,298 A * | 9/1998  | Moy ........................... 428/327 |
| 5,827,531 A   | 10/1998 | Morrison et al. ........... 424/450 |
| 5,938,581 A   | 8/1999  | Bibette et al. .............. 516/366 |
| 5,948,441 A   | 9/1999  | Lenk et al. .................. 424/489 |
| 5,990,183 A   | 11/1999 | Kawano et al. ............... 521/64 |
| 6,103,271 A   | 8/2000  | Morrison et al. ........... 424/490 |
| 6,143,211 A   | 11/2000 | Mathiowitz et al. ........... 264/4 |
| 6,200,548 B1  | 3/2001  | Bichon et al. ............. 424/9.51 |
| 6,377,387 B1* | 4/2002  | Duthaler et al. ............ 359/296 |
| 6,727,203 B1* | 4/2004  | Ichikawa ..................... 503/215 |

OTHER PUBLICATIONS

Japanese Laid-Open Patent Application (Kokai) No. Hei 4 [1992]-258601 Laid-Open Date: Sep. 14, 1992.

(Continued)

*Primary Examiner*—Richard L. Schilling
(74) *Attorney, Agent, or Firm*—Benjamin Mieliulis

(57) ABSTRACT

The present invention teaches an improved process for preparing a population of microcapsules having a substantially uniform size distribution, especially useful for manufacture of carbonless paper. The improved process teaches use of membrane material having a pre-selected pore size in the capsule manufacture process. A core material is provided along with a receiving solution for receiving the core material. The receiving solution is a nonsolvent for the core material. The core material is passed under pressure through the membrane into a moving or turbulent receiving solution forming uniform droplets of core material dispersed in the receiving solution. Wall-forming material is added to the receiving solution for coating the core material droplets. The coating on the droplets is polymerized forming microcapsules. This novel process also lends itself to microcapsule formation in a continuous process.

6 Claims, 3 Drawing Sheets

OTHER PUBLICATIONS

Japanese Laid Open Patent Application (Kokai) No. Hei 5 [1993]-240 Laid-Open Date: Jan. 8, 1993.

Japanese Laid Open Patent Application (Kokai) No. Hei 5 [1993]-192907 Laid-Open Date: Aug. 3, 1993.

Japanese Laid Open Patent Application (Kokai) No. Hei 11 [1999]-60615 Laid-Open Date: Mar. 2, 1999.

Synthesis and Characterization of Microporous Titanium-Silicate Materials, S. Mintova, B. Stein, J.M. Reder and T. Bein, Department of Chemistry, University of Munich, Butenandtstr. 5-13 (E), 81377 Munich, Germany.

Ordered Mesoporous Polymers of Tunable Pore Size from Colloidal Silica Templates, Stacy A. Johnson, Patricia J. Ollivier, Thomas E. Mallouk, Department of Chemistry, Pennsylvania State University.

Particle Control of Emulsion by Membrane Emulsification and its Applications, Tadao Nakashima, Masataka Shimizu, Masato Kukizaki, Advanced Drug Delivery Reviews 45 (2000 pp. 47-56).

A Novel Method to Prepare Monodisperse Microparticles, N. Muramatsu and K. Nakauchi, Faculty of Pharmaceutical Sciences, Science University of Tokyo, Ichigaya 12, Shinjuku, Tokyo, Japan, J. Microencapsulation, 1998 vol. 15, No. 6, 715-723.

Membrane Makes Homogeneous Emulsions, Chemical Engineering, Jun. 2000.

Controlled Production of Emulsions Using Crossflow Membrane—Part I, S. J. Peng, R. A. Williams, Trans Chem E. vol. 76, Part A, Nov. 1998.

Controlled Production of Emulsions Using Crossflow Membrane, S. J. Peng, R. A. Williams, Jun. 6, 1997.

Molecular Sieves Synthesis, H.G. Karge J. Weitkamp, E&MS TP159,M6 M65 1998 vol. 1.

Porous Silica Via Colloidal Crystallization, O.D. Velev, T.A. Jede, R.F. Lobo, A.M. Lenhoff, Scientific Correspondence, Nature, vol. 389, Oct. 2, 1997.

Synthesis of Macroporous Minerals with Highly Ordered Three-Dimensional Arrays of Spheroidal Voids, Brian T. Holland, Christopher f. Blanford, Andreas Stein, Science Magazine, Jul. 24, 1998, vol. 281.

Macroporous Membranes with Highly Ordered and Three-Dimensionally Interconnected Spherical Pores, San Hyun Park and Younan Xia, Advanced Materials, 1998, 10, No. 13.

Soft Lithography, Younan Xia and George M. Whitesides, Engew. Chem. Int. Ed., 1998, 37, 550-575.

* cited by examiner

UNIFORM MICROCAPSULES

This application is a divisional application under 35 U.S.C. § 121 claiming priority to application Ser. No. 10/099,757 filed Mar. 13, 2002 now U.S. Pat. No. 6,890,592.

BACKGROUND OF THE INVENTION

1. Field of the Invention

This invention relates to manufacture of microcapsules. It more particularly relates to methods of manufacture of microcapsules for diverse uses such as carbonless paper and fragrance delivery substrate products. The manufacturing methods taught herein enable the production of novel resulting microencapsulated products. Preferred embodiments of the invention are in the fields of microencapsulation, and the process is especially useful in the fields of carbonless paper, pressure sensitive adhesives, pressure sensitive indicators, and fragrance delivery substrates.

2. Description of Related Art

Many processes for microencapsulation are known. These include methods for capsule formation such as described in U.S. Pat. Nos. 2,730,456, 2,800,457; and 2,800,458. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; and British Patent No. 2,062,570 describing a process for producing microcapsules having walls produced by polymerization of melamine and formaldehyde in the presence of a styrenesulfonic acid. Microencapsulation is also taught in U.S. Pat. Nos. 2,730,457 and 4,197,346. Processes for forming microcapsules from urea-formaldehyde resin and/or melamine formaldehyde resin are disclosed in U.S. Pat. Nos. 4,001,140, 4,081,376; 4,089,802; 4,100,103; 4,105,823; 4,444,699. Alkyl acrylate—acrylic acid copolymer capsules are taught in U.S. Pat. No. 4,552,811. Each patent described is incorporated herein by reference to the extent each provides guidance regarding microencapsulation processes and materials.

U.S. Pat. No. 3,516,941 teaches microencapsulation processes in which the material to be encapsulated, or core material, comprising chromogen dissolved in an organic, hydrophobic oil phase is dispersed in an aqueous phase. The aqueous phase has dissolved wall forming material forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules proceeds via interfacial polymerization.

Common microencapsulation processes can be viewed as a series of steps. First, the core material which is to be encapsulated is emulsified or dispersed in a suitable dispersion medium. This medium is preferably aqueous but involves the formation of a polymer rich phase. Frequently, this medium is a solution of the intended capsule wall material. The solvent characteristics of the medium are changed such as to cause phase separation of the wall material. The wall material is thereby contained in the liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Gelatin or gelatin-containing microcapsule wall material is well known. Phase separation processes, or coacervation processes are described in U.S. Pat. Nos. 2,800,457 and 2,800,458. Encapsulations based on polymerization of urea and formaldehyde, monomeric or low molecular weight polymers of dimethylol urea or methylated dimethylol urea, melamine and formaldehyde, methylated melamine formaldehyde, monomeric or low molecular weight polymers of methylol melamine or methylated methylol melamine, as taught in U.S. Pat. No. 4,552,811 are incorporated herein by reference and preferable. These materials are typically dispersed in an aqueous vehicle and the reaction is conducted in the presence of acrylic acid-alkyl acrylate copolymers.

Microencapsulation processes typically rely on an emulsification and dispersion step. To be efficiently practiced on a large scale, large kettles and tanks become necessary.

A drawback of present methods for microcapsule production is that they tend to result in production of capsules of fairly wide size distribution. The smallest capsules, in many applications such as with carbonless copy paper production fall through the paper fiber interstices and are not available for imaging. As capsule size diminishes the wall material volume increases relative the volume of the core material resulting in capsules that often can be difficult to break.

Monosize capsules enable use of less wall material to coat the same amount of core material or internal phase.

The desirability of forming uniform capsules has been long recognized Rourke U.S. Pat. No. 5,643,506 teaches producing uniform capsules by minimizing residence time in the high shear zone of a rapidly rotating mixer blade.

Porous membrane materials although known and adapted for use in filters, colloids and as catalytic surfaces, have not been used in carbonless microcapsule production.

The present invention provides for an elegant means of capsule formation that enables more efficient formation of capsules and formation of a homogeneous microcapsule population having substantially uniform size distribution.

DETAILED DESCRIPTION

Figure 1:
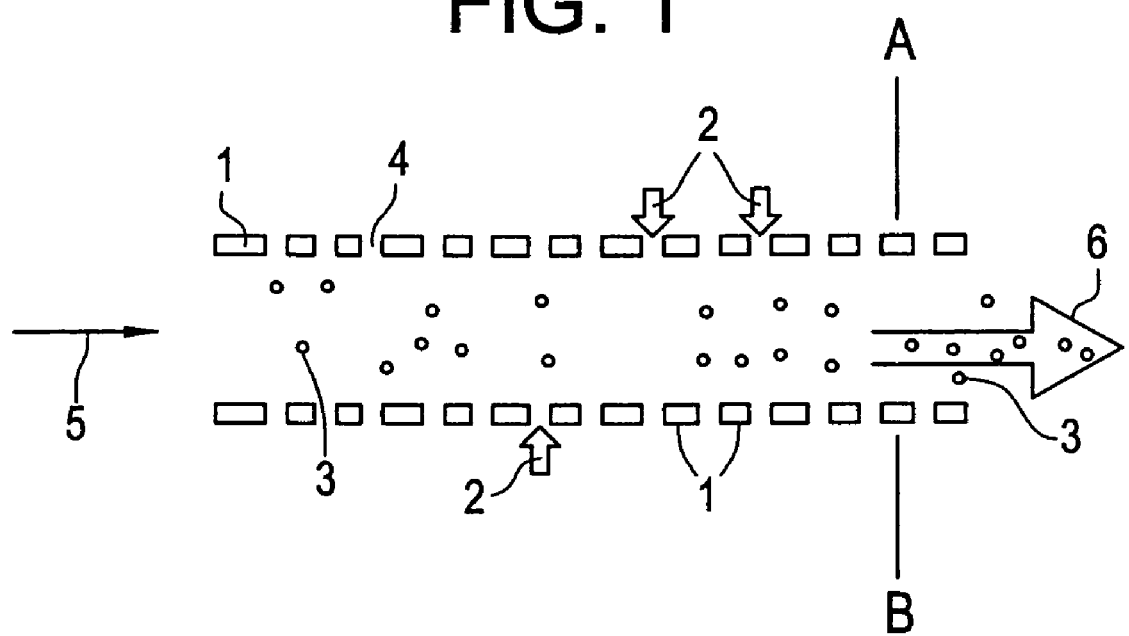
FIG. 1 is a sideways cross-section through a membrane fashioned as a tube.

The present invention is a process for preparing a population of microcapsules having a substantially uniform size distribution.

Typically the majority of the capsules formed by coacervation or interfacial processes range from about less than 1 to about 20 microns. These capsules typically are of a fairly wide size distribution with substantial quantities of diverse capsule sizes across the range. The present invention enables formation of mono-sized capsules. The invention enables selection of a microcapsule size and formation of capsules wherein preferably 80% and more preferably 90% of the capsules on a numerical basis are within about ±5 microns of the desired or selected size, and more preferably ±2 microns of the mean diameter, and most preferably ±1 micron of the mean diameter.

A convenient way of expressing microcapsule size distribution is by using an instrument such as an Accusizer to count the numbers of microcapsules detected at various sizes. An Accusizer 780 by Particle Sizing Systems, Santa Barbara, Calif. was useful for this purpose.

A monosized capsule is a population of microcapsules with a uniform diameter distribution. A convenient way of characterizing a uniform diameter distribution is by references to a broadness index. The broadness index is calculated as the diameter at which the number of capsules accounts for 95% of the numerical total of capsules, less the diameter at which the number of capsules accounts for 5% of the numerical total, divided by diameter at which the number of capsules accounts for 50% of the numerical total.

$$\text{Broadness Index} = \frac{(\text{diameter of 95\% of numerical total of capsules}) - (\text{diameter of 5\% of numerical total of capsules})}{\text{Diameter of 50\% of numerical total of capsules}}$$

Desirably the broadness index of capsules formed by the process of the invention is a value of less than 3.0, preferably less than 2.0, and more preferably less than 1.0.

The present invention is a process for preparing a population of microcapsules having a substantially uniform size distribution comprising, providing a membrane having a selected pore size, providing a hydrophobic core material, and providing an aqueous solution for receiving the hydrophobic core material. The hydrophobic core material is passed under pressure through a membrane of selected pore size thereby producing uniform droplets of hydrophobic core material dispersed in the aqueous solution or continuous phase. Wall forming material is added to the aqueous solution to coat the core material droplets thereby forming microcapsules.

The coating is further polymerized and hardened by temperature change such as heating or chilling, pH change, addition of a hardening reactant such as glutaraldehyde or by the combination of any of the above mentioned parameters to form finished microcapsules.

Essentially the receiving solution is a non-solvent for the core material. With appropriate selection of receiving solution the core material could optionally be selected to be hydrophobic and be received by a hydrophillic receiving solution or vice versa. The receiving solution is selected to be a nonsolvent for the core material. In an alternative embodiment, the core material is hydrophillic and received by a hydrophillic receiving solution which is a nonsolvent for the core material.

As used herein, "core material" is intended to mean all the materials encapsulated by the microcapsule wall material forming the internal contents of the microcapsule. The core material is typically fluid and can include solvent and other dissolved components such as chromogen, fragrance, adhesives, or other material depending on the intended application. Core material therefore in the case of carbonless microcapsules comprises solvent plus dissolved chromogen. Typically a microcapsule core material is a solvent plus a target material dissolved in the solvent and which is sought to be microencapsulated. The core material is often conventionally referred to as the internal phase with dissolved chromogen in the case of carbonless microcapsules.

In prior art processes for microencapsulation, the core material to be encapsulated is dispersed, customarily by stirring, in a solvent solution of a polymer while continually stirring to keep the core material uniformly dispersed throughout the polymer solution. A nonsolvent liquid is added to the polymer solution to change the polymer solubility in the medium and cause a phase separation of the dissolved polymer.

In the present invention, the core material, typically an oil solution (with dissolved chromogen or other target material) is forced under pressure through a membrane material having a selected pore size. For certain applications such as carbonless microcapsules the membrane has pores desirably of less than 3 microns, but usefully anywhere from 0.5 to 20 microns, and preferably from 0.25 to 2 microns. A uniform pore size is advantageous and preferred. Larger pore size could be advantageously employed for specialized applications where larger microcapsules, microballoons or spherical capsules desired. The pore size to final capsule size appears to have an approximate 1:5 relationship such that a 2 micron size pore generally yields a capsule in the area of about 10 microns. Obviously, it will be evident that several other factors can also affect capsule size including viscosity, velocity of the receiving solution, surface tension of the receiving solution and the core material, wall material, temperature, and the like. The core material is positioned on one side of the membrane. The core material is a solvent, plus a target material sought to be encapsulated. On the opposite side of the membrane is a receiving solution which is a nonsolvent for the core material. This receiving solution is a continuous phase or solvent solution of a wall forming polymer.

By using a membrane having a selected pore size, emulsions of core material can be prepared having a uniform controlled droplet size and uniform size distribution. The core material is injected directly into a moving receiving solution.

The membrane can be planar with core material positioned under pressure on one side and a receiving solution such as an aqueous solution on the other side of the membrane. As will be readily opponent to the skilled artisan, the membrane can take a variety of shapes and configurations. A planar or plate shape with receiving solution and core material positioned on opposite sides can be used, or alternatively, tubular structures with one or more conduit channels can be adopted.

More preferably the membrane is fashioned as a porous tubular structure having one or more conduit channels. Core material on one side of the tube can be forced under pressure through the porous tubular wall into a receiving solution flowing either through the one or more conduit channels of the tubular membrane structure, or on the outside of the porous tubular wall. The direction of core material flow is optionally selected, as is the transdermal direction.

For example, the membrane is fashioned as a porous tubular structure having one or more conduit channels. In one embodiment, core material can be forced under pressure through the one or more conduit channels into a receiving solution on the outside of the tube. The core material is on the opposite side of the membrane from the receiving solution, and is forced under pressure through the membrane into the receiving solution. As will be apparent to the skilled artisan, the reverse configuration is also readily workable. The receiving solution can be channeled through the conduits and the core material positioned under pressured on the outside of the tubular structure.

The tube can be conveniently selected to be of appropriate length to accommodate the rate of core material passage through the membrane material as droplets of core material into the receiving solution. The pressure applied to the core material to force migration through the pores of the membrane material is readily selectable by the skilled artisan. A positive transdermal pressure is needed. If desired for flow regulation purposes, optionally, some pressure on the receiving solution can also be applied or reduced to moderate flow rate. Reducing the pressure on the receiving solution is viewed as equivalent herein to applying pressure on the core material since a pressure gradient is thereby established. Table 1 illustrates useful pressures and other parameters.

By passing the core material under pressure through the membrane pores into a receiving solution which is a non-solvent for the core material, uniform droplets of core material are formed dispersed in the receiving solution.

The process of the invention is especially suited for manufacture of carbonless microcapsules. Uniform capsules or mono-sized capsules in carbonless applications enable manufacture of a carbonless paper having more intense imaging for an equivalent coat weight of microcapsule emulsion applied to a substrate such as a film or paper sheet. Monosized capsules provide the potential for using less wall material to coat the same amount of internal phase or core material by virtue of less total surface area of mono-sized capsules compared to conventional polydisperse capsules. With monosized capsules there are fewer very small oil droplets. The process is also useful in any application where uniform microcapsules are desirable. This could include microencapsulated solvents and chromogens, microencapsulated perfumes, microencapsulated adhesives and the like.

Extremely small capsules or fines representative of conventional microencapsulation processes are prone to being lost in between fiber interstices. These capsules are unavailable for imaging with the reactive CF sheet. Smaller capsules or fines typically have increasing wall thickness and surface area relative to content, therefore such capsules are also undesirable as more difficult to break.

Pressure sensitive carbonless copy paper of the transfer type consists of multiple cooperating superimposed plies in the form of sheets of paper which has coated, on one surface of one such ply, microcapsules containing a solution of one or more color formers (hereinafter referred to as a CB sheet) for transfer to the second ply carrying a coating comprising one or more color developers (hereinafter referred to as a CF sheet). To the uncoated side of the CF sheet can also be applied pressure-rupturable microcapsules containing a solution of color formers resulting in a pressure-sensitive sheet which is coated on both the front and back sides (hereinafter referred to as a CFB sheet). When said plies are superimposed, one on the other, in such manner that the microcapsules of one ply are in proximity with the color developers of the second ply, the application of pressure, as by typewriter, sufficient to rupture the microcapsules, releases the solution of color former (also called chromogenic material) and transfers color former solution to the CF sheet resulting in image formation through reaction of the color former solution with the color developer. Such transfer systems and their preparation are disclosed in U.S. Pat. No. 2,730,456.

A CB sheet traditionally consists of a substrate or base sheet coated with a color former layer consisting of a mixture of pressure-rupturable microcapsules, protective stilt material such as uncooked starch particles and one or more binder materials. The color formers, compared to the other components of the color former layer, are extremely costly and, therefore, maximizing the utilization of these color formers in the production of images is a continuing objective of pressure-sensitive carbonless copy paper manufacturers.

In the process of the invention, the intended core material of the microcapsules is passed under pressure through the membrane material having selected pore size.

A variety of porous glasses or molecular sieve materials are known. The membrane material is selected from any various glass, ceramic, or other known microporous materials and can include various silicas, silicates, ceramic, graphite, alumina, titania, powdered stainless steel, polymeric beads, metal silicas, metal silicates, zeolites and the like. The membrane can be a porous inorganic or porous polymeric material.

A preferred membrane material is a glass material. The glass can be formed by blending uniform sized sand particles. Uniform sand particulars are blended with calcium carbonate or calcium hydroxide together with boric acid and heated to about 1350° C. to sinter the material into a coherent mass. A uniform pore structure is achieved by etching or dissolving the calcite or calcium oxide and borate structure with hydrochloric or hydrofluoric acid to yield a porous silicate glass structure.

Porous membrane materials and molecular sieves although known, have heretofore been adapted for use primarily as filtration devices, devices for colloid formation, or catalytic surfaces. The invention surprisingly teaches use of such porous materials in a process making possible microencapsulation, and would lend itself to adoption in a continuous microencapsulation process.

Examples of such membrane materials include $Al_2O_3SiO_2$ glass structures available for example from SPG Technology Company in Miyazaki, Japan. SPG, for example, utilizes a uniform sized sand, blended with lime and boric acid and heated to 1350° C. The $CaOB_2O_3$ material is etched with hydrochloric acid to form a porous aluminum silicate glass structure. The more uniform sand particles yield a more uniform pore structure.

Molecular sieves based on silicas and silicates are also known.

Membranes for purposes of this invention include filters such as molecular sieve devices or metal filters of uniform pore size. Gaddis, U.S. Pat. No. 4,888,184 for example teaches a sintering process for forming a metal filter of uniform pore size from stainless steel and metal oxide particles. Koehler, U.S. Pat. No. 5,364,585 teaches a composite membrane formed from metallic particles and ceramic particles sintered to form a composite mass. Various metals, alloys, ceramics, and combinations of these materials are known for use in sintered membranes of uniform pore size. Stainless steels such as austenitic stainless steels are useful for high corrosion resistance. 316L stainless steels that are spherical typically are available in diameters of up to 10 microns. The size of the particle chosen is related to the needed pore size. 80 to 90% of the particles should be of the desired size and size distribution.

Ceramic having a uniform pore size have been taught produced from spherical ceramic particles or spherical granulated particles as an aggregate (Japanese Patent Kokai (Laid Open) No. 62-191480; U.S. Pat. Nos. 6,309,546; 5,851,649). Processes for making alumina particles round by calcining in a reducing atmosphere at a temperature of 1800° C. are taught in Japanese Patent Kokai (Laid Open) No. 2-149-482.

Porous glasses are taught in U.S. Pat. No. 5,009,688. Other particles known for producing porous membranes include polyhedral alumina or titania crystals. Inorganic particles can be molded into a desired shape followed by calcining. Molding can be accomplished by press molding, isotactic molding, extrusion molding, cost molding and the like. Molding aids such as organic materials removed by calcination or compatible with the inorganic particles during calcination can be included. Examples include polyvinyl alcohol, polyvinylbutyral, methyl cellulose, alumina sole, titania sol and the like, by way of illustration and not limitation. Calcination is usually accomplished at elevated temperature from about 1000° C. to 1800° C. It is known that the diameter and porosity of pores of an inorganic sintered body can be appropriately adjusted by selection of particle size and distribution.

Various techniques are also known for conditioning the membrane by modifying the hydrophillicity or hydrophobicity of the membrane.

For example, when aluminum silicas are used as the membrane and an oil with dissolved chromogen is desired to be suffused transdermally into an aqueous receiving solution; it is desirable to enhance the hydrophillicity of the membrane surface on the side of the membrane facing the aqueous receiving solution. This facilitates clean breaking off of discrete forming oil droplets as they exit the membrane, and minimizes adherence to the membrane wall.

If an aqueous solution is diffused into an oil receiving solution, then hydrophobicity is desirably enhanced with conditioning.

An acid soak is useful with aluminum silicates to enhance hydrophillicity. Other treatments can include applying a sol gel of fluoralkoxides of elements of group IIA in an organic solvent, followed by hydrolysing and washing away of any soluble salts.

Hydrophobicizing a glass membrane can be accomplished through chemical absorption on the membrane of a hydrophobic film such as dimethylpolysiloxane, silicone oils, methyltrimethylsilane, isopropyltristearyltitanote and the like as taught in Japanese Laid Open Patent Application (Kokai) No. 5[1993]-240 Application No. 3[1991]-153126 by Osaka Glass Co. ("Manufacture of Inorganic Uniform Microspheres." Silanation advantageously can produce more long lasting hydrophobic conditioning.

Hydrophillic character can be increased by treating with surfactants such as sodium dodecyl sulfate or sodium dodecylbenzene sulfate. For hydrophobicity cationic surfactants such as cetyl trimethylammonium bromide can be used.

Membranes with pores in the micrometer range, 0.1 to 110 microns, and preferably 0.25 to 20 micron pore size are the more useful for the processes of the invention. For specialized applications however, pore sizes smaller or larger than these ranges can be selected. Silicas and silicates are known for purposes of forming molecular sieves and other materials with a uniform pore structure. Although illustrated herein using etching as a means to form a uniform pore structure, other processes of forming such membranes with a uniform pore structure are also evident to the skilled artisan, such as use of a precision laser, dissolving, use of ordered polymers, use of uniform spherical beads, and the like. The manner of forming the micrometer range pores is not so important as the general uniformity of size.

The uniformity of size of the pore structure of the membrane is more important generally than the particular method of forming, molding, dissolving, etching, lasering, layering, calcining or other technique used to fashion the membrane material.

A variety of microporous materials are known including various glasses such silicas, silicates, metal silicas, zeolites, ceramics, alumina, titania, powdered steels, polymeric materials such as polymeric beads, laser inradiated polyimides or polycarbonates, nylon, polyvinylidene flouride, cellulose acetate/nitrate, polysulfone, polypropylene, polyamide and the like.

Additionally, polymeric materials such as ordered porous polymers or polymers of tunable pore size such as silica spheres filled with divinyl benzene and ethylene glycol dimethacrylate are known. See for example, Y. Xiz and G. M. Whitesides, Angew. Chem. Int. Ed. Engl. 37, 550 (1998); O. D. Velev, T. A. Jede, R. F. Lobo, A. M. Lenhoff, Nature 389, 447 (1997); B. T. Holland, C. F. Blanford and A. Stein, Science 281, 538 (1998); J. H. Park and Y. Xia, Adv. Materials 10, 1045 (1998); "Zeolite like Inorganic Compounds", Handbook of Molecular Sieves, Vol. 1, H. G. Karge (Eds) Springer 229 (1998).

Especially useful membrane material are those based on silicon compounds such as porous glasses formed from aluminum silicas such as sand.

For core material for carbonless applications, the core material is selected to be a solvent for the chromogenic material and a non-solvent for the receiving solution or continuous phase. The core material is passed through the membrane of pore size of 0.25 to 20 microns, preferably 0.25 to 2 microns, and more preferably from 1 to 2 microns, into the receiving solution forming discrete uniform droplets dispersed in the receiving solution.

The core material can be selected from solvents such as:
A. dialkyl phthalates in which the alkyl groups thereof have from 4 to 13 carbon atoms, e.g., dibutyl phthalate, dioctylphthalate, dinonyl phthalate and ditridecyl phthalate
B. 2,2,4-trimethyl-1,3-pentanediol diisobutyrate (U.S. Pat. No. 4,027,065)
C. ethyldiphenylmethane (U.S. Pat. No. 3,996,405)
D. alkyl biphenyls such as monoisopropylbiphenyl (U.S. Pat. No. 3,627,581)
E. $C_{10}$–$C_{14}$ alkyl benzenes such as dodecyl benzene
F. diaryl ethers, di(aralkyl)ethers and aryl aralkyl ethers, ethers such as diphenyl ether, dibenzyl ether and phenyl benzyl ether
G. liquid higher dialkyl ethers (having at least 8 carbon atoms)
H. liquid higher alkyl ketones (having at least 9 carbon atoms)
I. alkyl or aralky benzoates, e.g., benzyl benzoate
J. alkylated naphthalenes
K. partially hydrogenated terphenyls
L. vegetable oils, esters of vegetable oils If desired, common diluents such as straight chain hydrocarbons can be blended with the solvents, or blend of solvents.

For carbonless applications, a chromogenic material is dissolved in the core material. Representative examples of such compounds include substantially colorless compounds having a lactone, a lactam, a sulfone, a spiropyran, an ester or an amido structure in their partial skeleton such as triarylmethane compounds, bisphenylmethane compounds, xanthene compounds, fluorans, thiazine compounds, spiropyran compounds and the like.

Eligible electron donating dye precursors which are chromogenic compounds, such as the phthalide, leucauramine and fluoran compounds, for use in color-forming system are well known. Examples of such chromogens include Crystal Violet Lactone (3,3-bis(4-dimethylaminophenyl)-6-dimethylaminophthalide, U.S. Pat. No. RE23,024); phenyl-, indol-, pyrrol- and carbazol-substituted phthalides (for example, in U.S. Pat. Nos. 3,491,111; 3,491,112; 3,491,116; 3,509,174); nitro-, amino-, amido-, sulfon amido-, aminobenzylidene- halo-, anilino-substituted fluorans (for example in U.S. Pat. Nos. 3,624,107; 3,627,787; 3,627,787; 3,641,011; 3,642,828; 3,681,390); spiro-dipyrans (U.S. Pat. No. 3,971,808); and pyridine and pyrazine compounds (for example, in U.S. Pat. Nos. 3,775,424 and 3,853,869). Other specifically eligible chromogenic compounds, not limiting the invention in any way, are: 3-diethylamino-6-methyl-7-anilino-fluoran (U.S. Pat. No. 3,681,390); 2-anilino-3-methyl-6-dibutylamino-fluoran (U.S. Pat. No. 4,510,513) also known as 3-dibutylamino-6-methyl-7-anilino-fluoran; 3-dibutylamino-7-(2-chloroanilino)fluoran; 3-(N-ethyl-N-tetrahydrofurfurylamino)-6-methyl-7-3-5'6-tris(di-methylamino) spiro [9H-fluorene-9'1(3'H)-isobenzofuran]-3'-one; 7-(1-ethyl-2-methylindol-3-yl)-7-(4-diethylamino-2-ethoxyphenyl)-5,7-dihy-drofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilino-fluoran (U.S. Pat. No. 3,959,571); 7-(1-octyl-2-methylindol-3-yl-)-7-(4-diethylamino-2-ethoxyphenyl)-5,7-dihydrofuro[3,4-b]pyridin-5-one; 3-diethyalamino-7,8-benzofluoran; 3,3-bis(1-ethyl-2-methylindol-3-yl) phthalide; 3-diethylamino-7-anilino fluoran; 3-diethylamino-7-benzylamino-fluoran; 3'-phenyl-7-dibenzylamino-2,2'-spiro-di-[2H-1-benzo-pyran] and mixtures of any of the foregoing.

The receiving solution is a non-solvent for the core material. The receiving solution is typically an aqueous solution having a wall-forming material dispersed therein. The wall forming material can include urea and formaldehyde, melamine and formaldehyde, amine and aldehyde, polyester, polyurea, gelatin, dimethylol urea, methylated dimethylol urea, methylated melamine formaldehyde, methylated methylol melamine, and acrylic acid-alkyl acrylate copolymers.

As an alternative embodiment are encapsulations derived from interfacial processes. The wall forming materials can comprise two wall forming reactants. The first wall forming reactant is dissolved in the core material. The second wall forming material is dissolved in the receiving solution.

Examples of wall forming materials that comprise such two wall forming reactants include diacids and diols for forming polyester walls. Other wall forming materials comprised of two wall forming reactants include a diester and a diol; a metal salt of dibasic acid and a dihalide; glycol ester and diacid; diacid chloride and a diol; ethylene carbonate and a diacid; anhydride and diol; diphenol and diacid; diacetate of diphenol and diacid; alkali metal salt of diphenol and a diacid halogen; ethylene glycol and terephthalic acid. Polyamide walls can be formed from wall forming reactants, one of which is a dianhydride, the second reactant of which is a diamine or tetramine.

For example, hexamethylenediamine can be dissolved in the aqueous receiving solution and sebacyl chloride dissolved in a core material such as carbon tetrachloride. Alternatively ethylene glycol can be dissolved in water and terephtholic acid dissolved in a nonpolar organic solvent. This type of two component wall forming system can be run in either direction through the membrane such that the core material can be optionally selected to be the nonpolar organic solvent if pushed through the membrane, or alternatively, the aqueous solution can be the core material if it instead is pushed through the membrane into the nonpolar organic solvent on the opposite side of the membrane then being the receiving solution.

The process of the invention has the features illustrated in FIGS. 1 to 4. Membrane 1 which is a sintered material such as $Al_2O_3SiO_2$ glass, has pores 4 through which is forced under pressure, a core solution. Core solution flow through the membrane 1 is illustrated by arrows 2. The nonsolvent for the core solution enters from direction 5 dispersing droplets 3 about which the polymer wall forming polymer coats forming microcapsules. The slurry with capsules then exits in direction 6.

The microcapsule walls are polymerized and hardened by temperature change, pH change, or additioning of a hardening reactant to the receiving solution and nonsolvent for the core material. The nonsolvent for the core material is the receiving solution for the droplets of core material formed by passage through membrane 1.

Through pore size selection and membrane area selection, along with appropriate pressures applied, droplets of uniform size of core material can be forced through the membrane into the receiving solution.

With oil core material, an oil in water emulsion can be prepared by selecting a porous glass membrane. At a temperature of about 25° C., the oil is passed through membrane 1. In one embodiment the pore size is 1.4 microns. By forcing the oil through the membrane pores 4 at approximately from 2 to 10 ml/hour using a transmembrane pressure of 55 KPa, the resulting droplets are 6½ microns. On a weight basis up to 10 grams per hour flowing through the membrane was achievable. The resulting capsules are 6.5 microns using acrylic acid polyacrylate wall forming material.

The receiving solution can be arranged to recirculate past the membrane and operated until a desirable solids content of microcapsules in the receiving solution is achieved. The wall forming material can be added to the receiving solution when sufficient dispersed drops are detected, or optionally earlier. An alternative and desirable arrangement is in a continuous process when the membrane surface area is large enough and transdermal flow maintained to achieve a useable concentration of forming microcapsules as the oil droplets enter the receiving solution. In a continuous process, the receiving solution could be recirculated past one side of the membrane. When a desired concentration of droplets are suffused transdermally into the receiving solution, a portion of the receiving solution can be drawn off systematically into a second container for the step of coating or polymerizing the coated droplets to form microcapsules. By replenishing core and receiving solutions as they are consumed, a steady state operation can be achieved.

With an arrangement where recirculating receiving solution is used, the membrane can be of approximately 1 mm in thickness, diameter 10 mm and length 125 mm. Obviously variations in the dimensions are discretionary depending on the quantity sought to be emulsified and available time. Obviously for a continuous arrangement, the membrane area would need to be scaled up accordingly.

Certain minimum transdermal pressures are needed to create an emulsion of fluoran color-formers dissolved in alkyl diphenyl alkanes when suffused through or pushed through the membranes. With fluoran color formers dissolved in a solvent of alkyl diphenyl alkanes, such as a sec-butyl biphenyl ethane, it was found that minimal transdermal pressures of at least 20 KPa, and typically about 40 to 55 KPa were needed. The amount of transdermal pressure and transdermal flow is a function of a variety of factors including solvent and receiving solution viscosity, available membrane surface area, surface tension of the solutions used, pore size, pore density, membrane thickness, temperature and the like.

Figure 2:
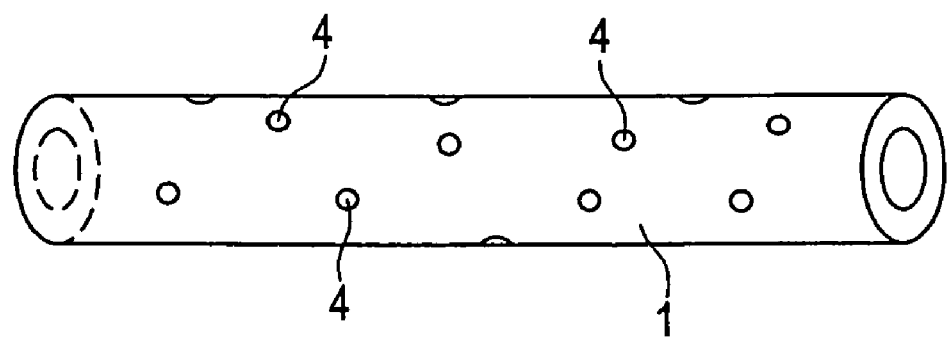
FIG. 2 is a side view of the tubular membrane of FIG. 1.

FIG. 2 is an external side view of the membrane 1 shown with pores 4. The pore size is exaggerated for purposes of illustration. Density of pores will be considerably higher than illustrated.

Figure 3:
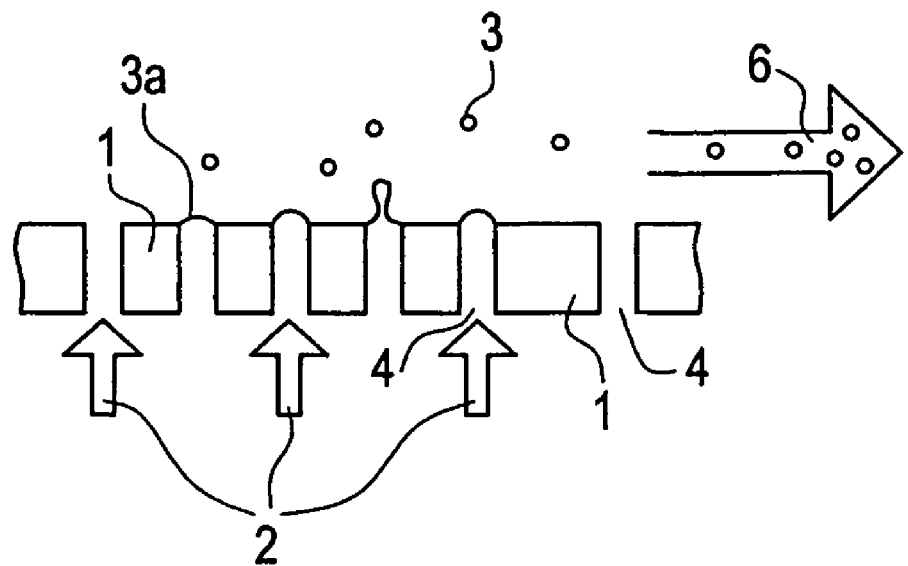
FIG. 3 is an edge view cross section of a planar membrane material.

FIG. 3 is an alternative embodiment of membrane 1 shown with core solution (represented by arrows 2) being shown forced under pressure through the pores of membrane 1 forming droplets 3. Droplets 3 are dispersed into the receiving solution which is a nonsolvent for the droplets or core material. Forming droplets 3a are illustrated at the membrane interface with the receiving solution as core material is forced through pores 4. The nonsolvent solution with droplets about which wall material is formed can be moved away from the membrane by flow of the receiving solution along direction 6.

Figure 4:
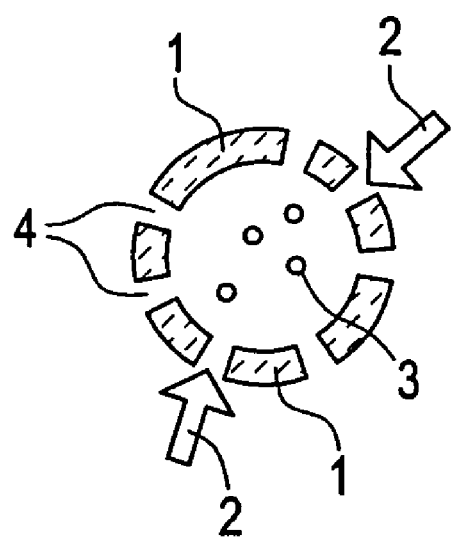
FIG. 4 is an axial view along line segment AB of the tubular structure of FIG. 1.

FIG. 4 is an axial view along line segment AB of the tubular structure of FIG. 1. Core solution (represented by arrows 2) is forced through the pores defined by membrane 1 forming uniform droplets 3.

Figure 5:
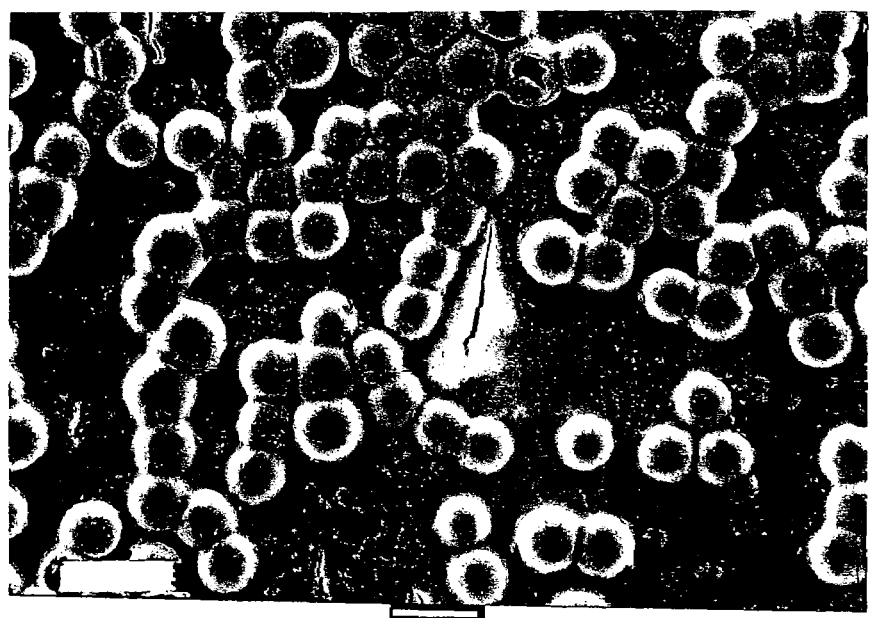
FIG. 5 is a photomicrograph of microcapsules made by conventional processes, such as taught by U.S. Pat. No. 4,552,811.
Figure 6:
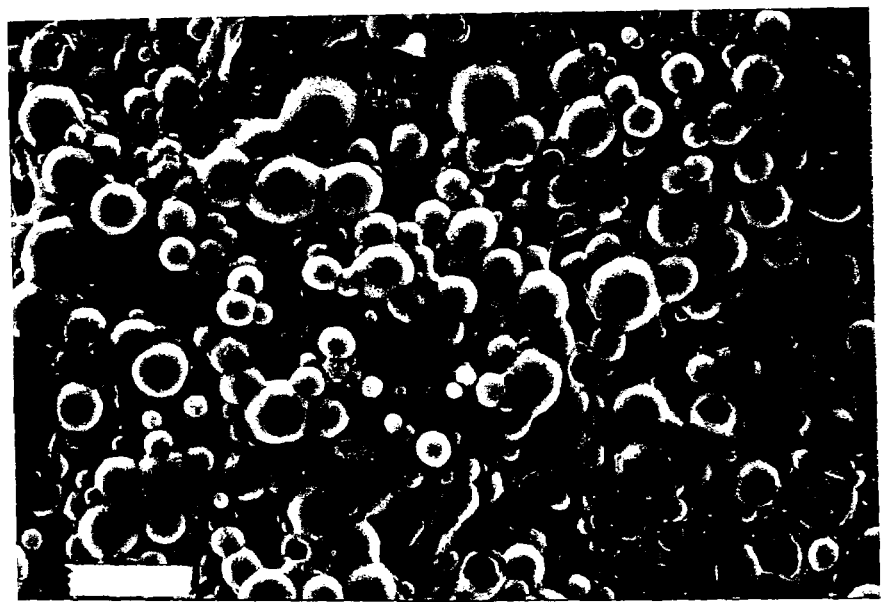
FIG. 6 is a photomicrograph of microcapsules made according to the invention.

FIG. 5 and FIG. 6 illustrate the difference between the microcapsules made by a conventional (FIG. 5) microencapsulation process; and, the uniform capsules (FIG. 6) produced according to the process of the invention. FIG. 5 is at 1110× magnification. FIG. 6 is at 1100× magnification.

solution in methanol, then heated at 500° C. for 2 hours to remove any impurities, then soaked in a 2N HCl solution for two hours to condition.

The membrane, about 1 mm thick, fashioned as a tube structure with a 10 mm diameter and length of about 125 mm was installed into a holder. The core material was pressurized and flowed through a conduit channel in the inside of the membrane tube. The receiving solution was recirculated with slow agitation around the interior of the membrane tube at a rate of 160 mL/min. until a desired concentration of uniform droplets is obtained A positive pressure was gradually applied to the core material using $N_2$ gas to exert about 55 KPa. Using this procedure 51.9 grams of core material was suffused transdermally through the membrane over 21 hours.

With continued agitation, 28 grams of a solution of partially methylated methylol melamine (Cymel 385, 80% solution, Cytec) in 33 grams of water, and 23 grams of 5% NaOH and 22 grams of butyl acrylate acrylic acid copolymer was gradually added to the receiving solution. The emulsion was heated to 65° C. for 8 hours. The pH was adjusted to 8.5 with ammonium hydroxide.

In the TI test a standard pattern is typed on a CB-CF pair. The reflectance of the typed area is a measure of color development on the CF sheet and is reported as the ratio of the reflectance of the typed area to that of the background reflectance of the CF paper (I/Io), expressed as a percentage.

TI is the intensity of image color developed by the impression with an impact printer or typewriter using a standard pattern. Static smudge is the smudge caused by low force. Smudge intensity can be calculated as:

$$\frac{\text{Reflectance of typed area or of smudged area}}{\text{Reflectance of untouched area}} \times 100 \, (\%)$$

The print intensity from a TI test expressed in a I/Io % terms is useful for demonstrating whether one image is more or less intense than another. Use of the Kubelka-Munk

TABLE 1

| Membrane | Pore Size | Core Material | Transdermal Pressure | Droplet Size | Receiving Solution | Broadness Index |
|---|---|---|---|---|---|---|
| Aluminum Silicate | 1.1 micron | Oil | 90 KPa | 3.7 micron | aqueous | 0.7 |
| Aluminum Silicate | 1.4 micron | Oil | 53 KPa | 6.5 micron | aqueous | 0.7 |
| Aluminum Silicate | 2.0 micron | Oil | 25 KPa | 10 micron | aqueous | 0.6 |

EXAMPLE

A core material solution was prepared by adding 238 grams of a sec-butyl biphenyl solvent to 11.9 grams of a fluoran colorformer such as 3-diethylamino-6-methyl-1-7-(2',4'-dimethylanilino)fluoran in an Erlenmeyer flask and heating to 110° C. until the dye dissolved. Blends of dyes can also be used. The solution was cooled to room temperature.

23.9 grams of a butylacrylate acrylic acid copolymer was mixed with 1.1 grams of a 20% solution of HCl in 124.7 g of water giving a pH of 4.

A sintered aluminum silicate glass membrane with pores of 1.4 microns was thoroughly cleaned in a dilute HCl function as a means of determining the quantity of color present is discussed in TAPPI, Paper Trade J., pages 13–38 (Dec. 21, 1939).

The coat weight below represents the weight of the color former microcapsules only and does not include the weight of the starch binder or starch particles.

| | Kubelka Monk Intensities/Ct. Wt. (gsm) | |
|---|---|---|
| | K.M. 24 Hour TI/Ct. Wt. | K.M. Static Smudge/Ct. Wt. |
| Conventional (Control) | 27.4 | 4.7 |
| Monosize | 39.9 | 3.3 |

Equivalent weights of conventional capsules and capsules made according to the invention were coated onto a film substrate. 24 hour typewriter intensities were observed higher with monosized capsules. Static smudge was lower with monosized capsules and is attributable to the reduced presence of fragile oversize capsules in the conventional capsule coating.

A smaller value would indicate lighter smudge.

The control capsules were prepared using similar materials, according to the process of U.S. Pat. No. 4,552,811. For the control, dispersion was accomplished using a Waring blender.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

We claim:

1. A population of microcapsules having a substantially uniform size distribution and a mean diameter wherein at least 90% of the microcapsules on a numerical basis are within ±1 micron of the mean diameter, said population of microcapsules being useful for manufacture of carbonless paper, said microcapsules produced by providing a membrane having a selected pore size, providing a core material wherein the core material is a hydrophobic material and solvent for a chromogenic material, providing an aqueous solution for receiving the core material, passing the core material under pressure through said membrane into the aqueous solution to form uniform droplets of core material dispersed in the aqueous solution, adding wall-forming material to the aqueous solution to coat the core material droplets to form microcapsules, heating the microcapsules to polymerize the wall material, adjusting the pH to harden the wall material.

2. The microcapsules according to claim 1 wherein the wall forming material is comprised of two reactive wall forming components, the first wall forming reactive component is dissolved in the core material, the second wall forming component is dissolved in the receiving solution.

3. The microcapsules according to claim 2 wherein the two reactive wall forming components comprise a diacid and a diol, a diester and a diol, a metal salt of dibasic acid and a dihalide, glycol ester and diacid, diacid chloride and diol, ethylene carbonate and diacid, anhydride and diol, diphenol and diacid, diacetate of diphenol and diacid, alkali metal salt of diphenol and a diacid halogen, a diamine and a dianhydride, a tetramine and a dianhydride.

4. The microcapsules according to claim 1 wherein the core material comprises a chromogen and a solvent selected from a dialkyl phathalate, alkyl biphenyl, alkyl benzene, diaryl ether, di(aralkyl)ether, aryl aralkyl ether, alkyl ketone, alkyl benzoate, aralkyl benzoate, alkylated naphthalene, a partially hydrogenated terphenyl, a vegetable oil, and a vegetable oil ester.

5. The microcapsules according to claim 1 wherein the wall-forming material comprises a material comprises a material selected from a gellable colloid, carboxy methyl cellulose, gelatin, gelatin-gum arabic, melamine formaldehyde, methylol melamine, urea formaldehyde, dimethylol urea, methylated dimethylol urea, methylated melamine formaldehyde, methylated methylol melamine, a gelatin-anionic polymer, alkylacrylate-acrylic acid copolymer, or reaction product with any of the foregoing.

6. The microcapsules according to claim 1 wherein the microcapsules have a broadness index of less than 1.0.

* * * * *